United States Patent [19]

Narasimhan et al.

[11] Patent Number: 4,790,473
[45] Date of Patent: Dec. 13, 1988

[54] PROCESS FOR WELDING A CAST IRON WEAR MEMBER TO A CAM FOLLOWER

[75] Inventors: Sundaram L. Narasimhan, Marshall; Ronald J. Lake, Battle Creek; Jay M. Larson, Marshall, all of Mich.

[73] Assignee: Eaton Corporation, Cleveland, Ohio

[21] Appl. No.: 8,147

[22] Filed: Jan. 22, 1987

Related U.S. Application Data

[63] Continuation-in-part of Ser. No. 924,298, Oct. 29, 1986, abandoned.

[51] Int. Cl.⁴ .................... B23K 9/235; B23K 15/00; F01L 1/14
[52] U.S. Cl. .................... 228/206; 228/208; 228/232; 228/263.14
[58] Field of Search .................... 29/156.7; 123/90.51; 228/263.14, 232, 206, 208; 219/121 ED, 121 LD

[56] References Cited

U.S. PATENT DOCUMENTS

| 3,224,243 | 12/1965 | Van Deberg | 123/90.51 X |
| 4,270,496 | 6/1981 | Narasimhan et al. | 123/90.51 |
| 4,561,484 | 12/1985 | Usui et al. | 228/206 X |

FOREIGN PATENT DOCUMENTS

| 13323 | 7/1980 | European Pat. Off. | 228/263.14 |
| 2455944 | 1/1981 | France | 228/263.14 |
| 54287 | 3/1985 | Japan | 219/121 ED |
| 8100820 | 4/1981 | World Int. Prop. O. | 228/263.14 |

Primary Examiner—Kenneth J. Ramsey
Attorney, Agent, or Firm—A. E. Chrow

[57] ABSTRACT

A cam follower and process of manufacture in which a hardenable cast iron reaction member is welded, as by high energy beam welding, to the end of a tubular, mild steel base member. The surface of the reaction member may be decarburized before welding. The weld is preferably characterized by austenitic properties and is formed by an alloy of nickel with the metal of the cam follower members.

7 Claims, 1 Drawing Sheet

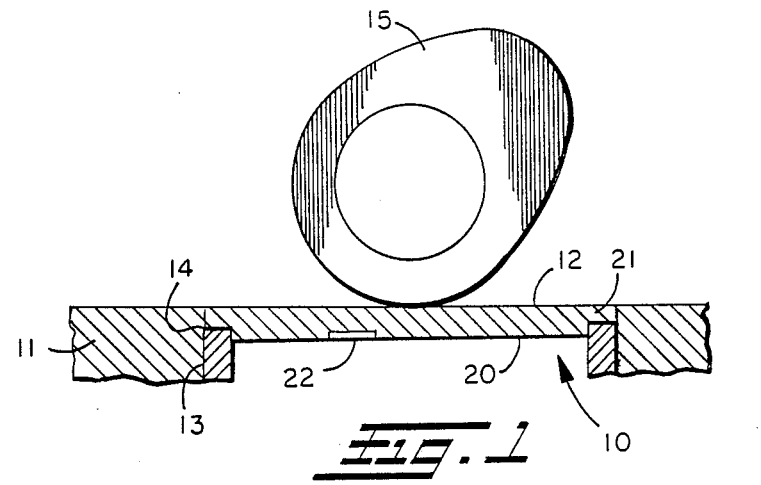
_Fig. 1_
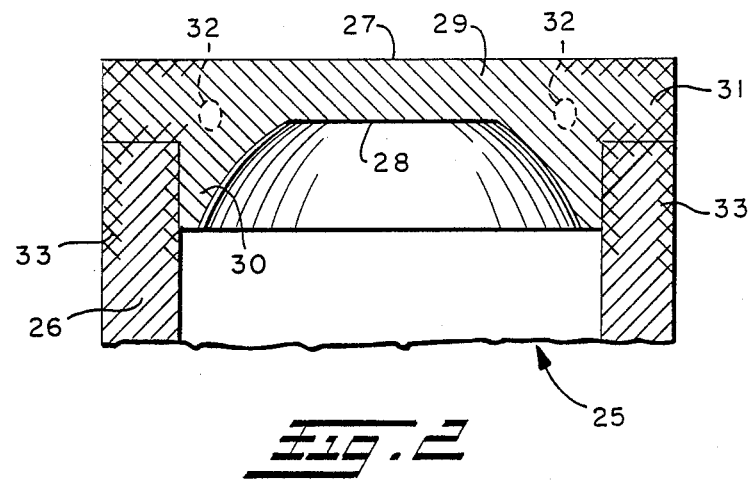
_Fig. 2_
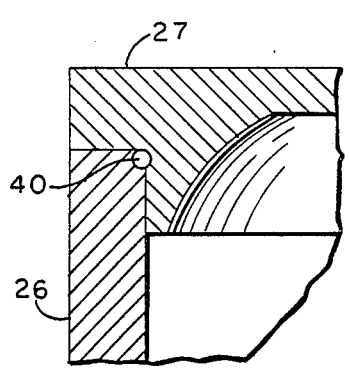
_Fig. 3_
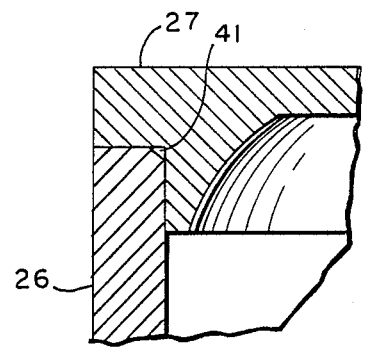
_Fig. 4_

PROCESS FOR WELDING A CAST IRON WEAR MEMBER TO A CAM FOLLOWER

This application is a continuation-in-part of application Ser. No. 924,298, filed Oct. 29, 1986, now abandoned.

DESCRIPTION

1. Technical Field

This invention relates generally to cam followers, and more specifically to the manufacture of cam followers of the type described in U.S. Pat. No. 4,270,496 which have a cast iron reaction surface welded to a tubular steel base. The invention is particularly concerned with the manufacture of a cam follower of the type described which is characterized by improved structural soundness and weld integrity.

2. Background Art

The need to reduce the cost and weight of all engine components has given rise to light weight cam followers of brazed or welded construction. U.S. Pat. No. 4,270,496, the disclosure of which is incorporated herein by reference, describes a novel welded construction comprising an abrasion and wear resistant, disc shaped reaction member or plate welded to a tubular base member made of mild steel. The reaction plate, which engages a cam, can be formed from a high carbon or heat treatable alloy steel, hardenable cast iron, or a composite nonferrous alloy having the desired surface wear properties.

Hardenable cast iron is a desired material for the reaction member because of its wear properties, lighter weight and low cost, but it has the disadvantage of being difficult to weld to mild steel. The graphite in the iron oxidizes during welding to cause significant weld porosity with resulting loss of structural soundness and weld integrity.

3. Disclosure of the Invention

The purpose of the invention is to overcome the problems involved in welding hardenable cast iron to mild steel, and more particularly to provide a cam follower of the type described in which a weld between the cast iron reaction member and steel base member is characterized by improved impact strength, ductility and structural soundness. The invention also provides a new reaction member structure characterized by improved strength and resistance to cracking.

In one embodiment of the invention, the surface of the cast iron reaction member at the interface of the weld is decarburized in order to reduce carbon oxidization. The decarburized reaction member can be welded to the steel base member by a high energy beam welding process, such as laser or electron beam welding.

A preferred embodiment of the new cam follower construction is characterized by an austenitic weld zone between the cast iron and steel members, the weld zone being an alloy of nickel with the metal of the two members. In this embodiment of the reaction member can be in either an as-cast or decarburized condition. The nickel brings the melting points of the cast iron and steel closer to each other and inhibits diffusion of carbon from the cast iron to the steel. The austenitic properties of the weld are characterized by good ductility and impact resistance.

The preferred austenitic weld is achieved by interposing a nickel-rich consumable weld metal between the hardenable cast iron reaction member and the steel base member. This may be done by nickel plating the weld surface interface of the tubular steel base member. Alternatively, a nickel wire, washer or other preformed shape can be placed between the base member and the reaction member.

Another aspect of the invention is the provision of a cam follower reaction member having an arched undersurface which provides a relative thin center section surrounded by a thicker section near the periphery of the member. Inherent shrinkage porosity occurring during casting is preferentially located in the thicker section rather than the thinner center portion which is engaged with the cam. The arched shape of the reaction member resists deflection by transferring bending loads to the base member.

Other features, advantages and a fuller understanding of the invention will be had from the following detailed description and the accompanying drawings.

BRIEF DESCRIPTION OF THE DRAWINGS

FIG. 1 is a fragmentary, cross-sectional elevation of a cam and cam follower made according to the invention;

FIG. 2 is a fragmentary, cross-sectional elevation of a modified cam follower; and FIGS. 3 and 4 are fragmentary, cross-sectional elevations showing modifications of the weld joint in the cam follower of FIG. 2.

BEST MODE FOR CARRYING OUT THE INVENTION

FIG. 1 shows the top portion of a cam follower 10 which is slidably mounted in an engine cylinder head 11. The cam follower 10 is comprised of a disc shaped reaction member 12 which is welded to the end of a tubular base member 13. The weld area is generally designated by reference numeral 14. As is well known in engine design practice, the follower 10 is biased upwardly so that the place or disc 12 reacts against an engine cam 15. Reference is made to U.S. Pat. No. 4,270,496 which discloses the construction and operation of the cam follower 10 in more detail.

As shown in FIG. 1, the disc 12 is hat-shaped, having a central portion 20 surrounded by a rim 21 of lesser thickness. The central portion 20 has a force fit in the end of the tubular base 13. It is to be understood, of course, that the member 12 can be a flat plate if desired. Reference numeral 22 designates a notch that permits oil flow when the follower 10 is assembled into a hydraulic lifter, the details of which are not shown.

The reaction member 12 is preferably made of a hardenable or mottled cast iron. An exemplary nominal composition of the hardenable cast iron contains in percent by weight: 3.2 C, 0.8 Mn, 2.2 Si, 1.0 Cr, 0.4 Ni, 0.4 Mo, and the balance iron. The tubular base member 13 is formed of a mild steel, as for example, a steel having a carbon content of from about 0.05% to about 0.20%.

In accordance with a preferred practice of the invention, a nickel-rich consumable weld metal is interposed between the members 12, 13 prior to the welding operation. The weld material can be elemental nickel or a nickel-bearing alloy such as any of the austenitic stainless steels of the A.I.S.I. 300 Series. In the embodiment of FIG. 1, elemental nickel is plated on the end portion of the tubular base 13 by electroless or electrolytic plating to a thickness of about 0.001–0.003 inch. Alternatively, the nickel-rich weld metal can be in the form of a wire, washer, foil preform, etc. which is placed at the end of the base member 13 before assemblying the reaction member 12.

Referring to FIG. 2, reference numeral 25 generally designates a modified cam follower comprised of a mild steel base member 26 and a hardenable cast iron reaction member 27. In this embodiment the member 27 has a flat reaction surface and an arched undersurface 28 which provides a relative thin center portion 29 surrounded by a thicker section 30. The thick section 30 fits tightly into the end of the tubular base member 26, while a peripheral flange 31 around the section 30 abuts the end of the member 26.

The arched shape of the reaction member 27 resists deflection by transferring bending loads resulting from engagement with the associated engine cam (not shown) to the base member 26. In addition the inherent shrinkage porosity, shown schematically at 32, that results from casting is preferentially located in the thick section 30 rather than in the thinner central portion 29. As a result, the illustrated shape of the reaction member 27 provides for a sound structure that resists cracking during use.

As in the embodiment of FIG. 1, the end portion 33 of the member 26, i.e., the end surface and adjacent inner wall surface around section 30, can be nickel plated to provide nickel-rich consumable weld metal between the mating surfaces of the members 26, 27. In alternative procedures, the nickel-rich weld metal can be interposed between the members 26, 27 by placing a preformed shape, washer, etc. at the end of the member 26 before the welding operation.

FIG. 3 shows a modification of the FIG. 2 structure wherein the inner upper edge of the member 26 and the adjacent surface of the member 27 are grooved to form a recess 40 that receives a nickel wire (not shown). The nickel wire serves as an alternative to the previously described nickel plating. In the embodiment of FIG. 4, the inner upper edge of the member 26 is removed to form a recess 41 that receives the nickel wire (not shown).

It is to be understood that FIGS. 1-4 are merely illustrative of several different cam follower designs incorporating a cast iron member welded to a steel member. The configuration of the cast iron member can be widely varied and the weld can be placed at any desired location spaced axially from reaction surface. For example, the reaction member can be cup-shaped and have its lip welded to the end of the steel base member.

In carrying out the preferred practice of the invention, the cast iron reaction member is assembled to the end of the mild steel base member and the nickel-rich weld metal is interposed therebetween, as by plating the end of the base member before assembly or by placing a nickel or nickel alloy shape between the members. The assembly is then pre-heated, for example, to a temperature of about 600° F., in order to reduce or prevent cracking during welding. The assembly preferably is subjected to a gas laser welding or electron beam welding operation in accordance with conventional practices, although other welding techniques can be employed, if desired. Such welding of the members with the interposed nickel rich weld metal creates an austenitic weld zone formed by an alloy of nickel with the metal of the two members. The presence of the nickel also has the effects of bringing the melting points of the steel and cast iron members closer to each other and inhibiting diffusion of carbon from the cast iron to the steel. The resulting austenitic weld is characterized by good ductility and impact strength. Following welding, the assembly is again heated to about 600° F. in order to assure that cracking will not occur.

Nickel alloying of the weld fusion zone between the reaction member and the base member has been shown to result in increases in strength, ductility and toughness, thereby dramatically increasing fatigue life under actual dynamic running conditions. Eight test samples were made of the design shown in FIG. 1. In four samples nickel plating was applied to the end of the base member, and in four samples the plating was eliminated. Two plated and two unplated samples were subjected to static loads applied to the undersurface of the reaction members in order to determine "pushout strength." The other four samples (two plated and two unplated) were subjected to cyclic dynamic loading in a manner simulating actual cam-tappet loading. This was done by applying a pushout load to the under surface of the reaction member at its center and an offset cam loading to the outer surface. The results of these tests are tabulated in the following table. It will be seen that the pushout strengths of both plated samples were better than the strength of the unplated ones. The most dramatic improvement was in fatigue life. For example, sample 5 cycled 210,100 times before cracking compared to 34,670 times for sample 8 which means an increase of over 6 times.

| Test Sample No. | Nickel Plating | Pushout Strength Lbs. | Fatigue Life (cycles) at 0-3000 Lb. Compression |
| --- | --- | --- | --- |
| 1 | Yes | 3750 | |
| 2 | Yes | 4050 | |
| 3 | No | 3450 | |
| 4 | No | 3650 | |
| 5 | Yes | | 210,100 |
| 6 | Yes | | 125,000 |
| 7 | No | | 47,310 |
| 8 | No | | 34,670 |

In order to suppress the development of weld porosity caused by carbon oxidation, it may be desired to decarburize the surface of the cast iron reaction member at the interface of the weld area to a depth of about 0.003-0.005 inches prior to welding. The decarburizing treatment is intended to reduce the carbon level (e.g., 2.5-3.6%) to a level approaching that of the mild steel base member. The decarburizing treatment can be used in conjunction with the previous described procedures of forming a nickel-rich weld between the members 11, 12 and 26, 27. It is also contemplated that a strong, porosity-free weld can be achieved without introducing nickel or nickel alloy simply by decarburizing the cast iron member in the described manner.

Many modifications and variations of the invention will be apparent to those skilled in the art in light of the foregoing disclosure. Therefore it is to be understood that, within the scope of the appended claims, the invention can be practiced otherwise than as specifically shown and described.

We claim:

1. In a process for making a cam follower having a cast iron reaction member welded to a steel base member at respective interfacing surfaces therebetween, the improvement comprising the steps of:

plating a nickel-rich consumable weld metal onto the steel member interface surface; and welding said members at said interface, whereby the presence of the nickel-rich consumable plating produces a weld zone therebetween having austenitic properties including good ductility and impact resistance.

2. A process for making a cam follower having an end surface of a tubular steel base member welded to a surface of a cast iron reaction member, the process comprising the steps of;

plating said base member end surface with nickel-rich consumable weld metal, fitting said reaction member surface to the base member plated end surface, heating said fitted members, welding said members together to create an austenitic weld zone formed by an alloy of said plating and the material of said reaction and base members, and heating said reaction and base members after welding to reduce cracking.

3. The process of claim 1 or 2 wherein said welding step is carried out by high energy beam welding.

4. The process of claim 1 including the step of decarburizing the surface of said reaction member prior to welding.

5. The process of claim 1 or 2 wherein said nickel-rich weld metal is elemental nickel.

6. The process of claim 1 or 2 wherein said nickel-rich weld metal is an austenitic stainless steel having good weldability.

7. The process of claim 2 including the step of decarburizing the surface of said reaction member prior to the step of fitting the reaction and base members together.

* * * * *